Figure 1:
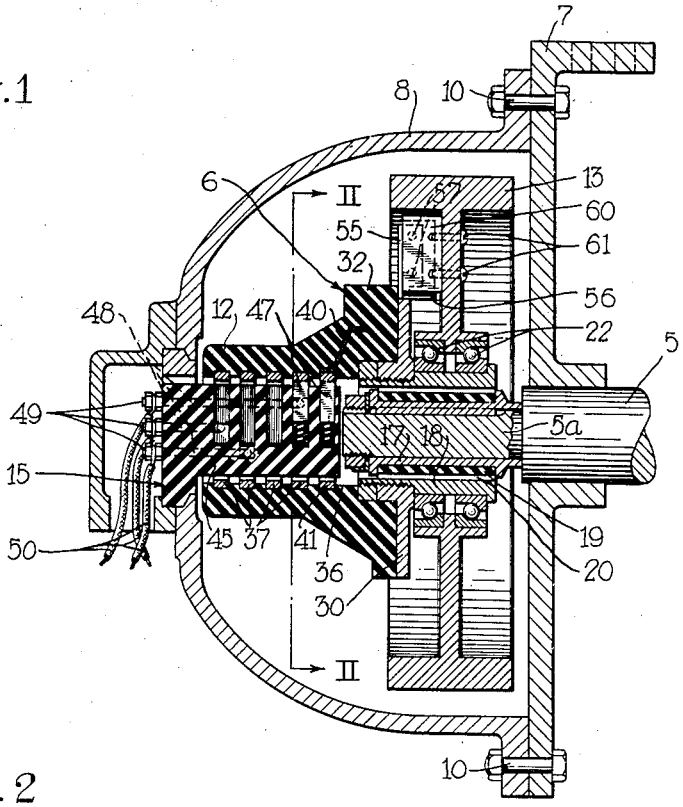

Sept. 1, 1942.   G. K. NEWELL   2,294,606

INERTIA OPERATED DEVICE

Filed July 31, 1941

INVENTOR
George K. Newell
BY
ATTORNEY

Patented Sept. 1, 1942

2,294,606

UNITED STATES PATENT OFFICE 2,294,606

INERTIA OPERATED DEVICE

George K. Newell, near Pitcairn, Pa., assignor to The Westinghouse Air Brake Company, Wilmerding, Pa., a corporation of Pennsylvania Application July 31, 1941, Serial No. 404,810

5 Claims. (Cl. 200—52)

This invention relates to rotary inertia responsive control devices, and more particularly to a rotary inertia device designed to respond to the acceleration or deceleration of a vehicle wheel or axle for controlling the vehicle brakes, sanding apparatus, and the like.

Trains designed for operation in modern high speed railway service are usually equipped with highly sensitive electropneumatic brake systems, which must to a large extent be automatically controlled in order that the brakes can be operated to provide the greatest possible rate of deceleration of a train without causing damage or excessive wear of operating elements, such as car wheels. One form of automatic train control equipment designed for high speed service includes control means adapted to respond to slipping of a vehicle wheel, or to an initial retardation of the wheel at a rate tending to exceed that of the vehicle, for causing sanding of the rails and release of the associated brakes in time to prevent locking and sliding of the wheel. A control system of this type has been disclosed in the United States Patent No. 2,229,515, which was issued to Joseph C. McCune on January 21, 1941 and has been assigned to the assignee of the present application.

In my copending application Serial No. 381,047, which was filed in the United States Patent Office on February 28, 1941, there is disclosed a rotary inertia device which is particularly adapted for association with a train sanding and braking control system of the type above referred to, and which comprises an inertia responsive member adapted to be driven at a speed corresponding to that of a vehicle wheel, magnet means for transmitting driving torque to the inertia member from a driving element, and a circuit controlling mechanism operable by the inertia element when the associated wheel tends to slip with respect to the rail.

The principal object of the present invention is to provide an improved rotary inertia responsive control device of simple and inexpensive construction, and which like the device just referred to, embodies magnetic means constructed and arranged to provide the necessary yieldable driving connection between the driving and driven elements thereof.

Another object of the invention is to provide an acceleration or deceleration control apparatus including a rotary driving element, a freely mounted inertia responsive driven element, a circuit control mechanism operable upon relative movement between said elements, and a yieldable driving connection therebetween comprising at least one magnet mounted on the driving element and at least one magnet mounted on the driven element.

Figure 2:
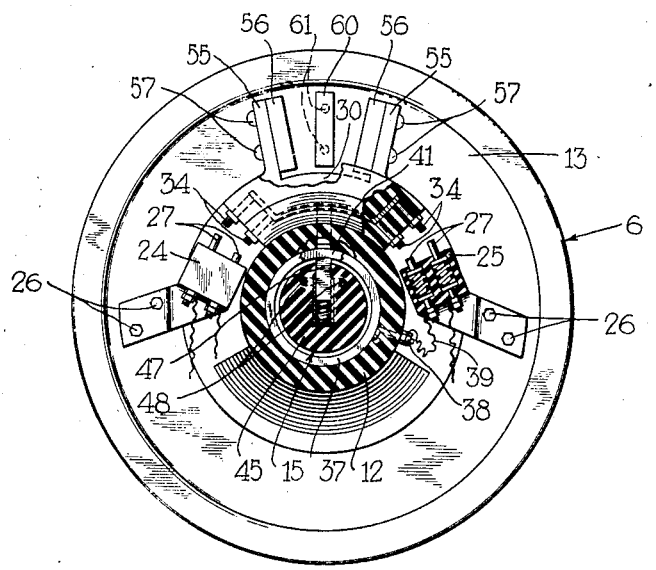

Other objects and advantages of the invention will appear in the following more detailed description thereof, taken in connection with the accompanying drawing, wherein Fig. 1 is an elevational view, mainly in section, of a rotary inertia device constructed in accordance with my invention; and Fig. 2 is a sectional view taken substantially along the line 2—2 of Fig. 1.

Referring to Fig. 1 of the drawing, there is illustrated a preferred embodiment of my invention in a form particularly designed for association with the journal box structure, not shown, of a railway truck having an axle 5. It will be understood that the axle 5 forms part of a wheel and axle assembly of the usual construction, and that the railway truck may be of any well known type equipped with air brake and sanding control apparatus of a suitable design, although these elements are not illustrated in the drawing. The improved inertia responsive device is indicated generally by the reference character 6, and is adapted to be enclosed within a casing structure comprising a supporting plate 7 that may be bolted or otherwise secured to the usual journal box associated with the axle 5, and a dome-shaped casing section 8 which is mounted on the supporting plate 7 by means of bolts 10. Among the operating elements of the rotary inertia device 6 that are disposed within the casing structure are a rotatable commutator block 12 that is carried on the axle 5 in a manner hereinafter explained, an inertia responsive member or flywheel 13, which is arranged for rotation with the axle 5 and also for angular displacement with respect to the rotatable commutator block 12, and a stationary brush holder 15 which is suitably secured to the outer end of the casing section 8.

To consider the elements of the rotary inertia device 6 in greater detail, the axle 5 has formed thereon an extension 5a, on which is mounted a cylindrical cushioning unit comprising an inner cylinder 17 that is suitably keyed to the axle extension, an outer cylinder 18, and a resilient rubber element 19 interposed between and bonded to the inner and outer cylinders. The rubber element 19 is preferably provided with longitudinal slots 20 and is adapted to absorb shocks that might otherwise be transmitted from the wheel and axle assembly of the associated vehicle truck to the operating elements of the rotary inertia device 6. The flywheel 13 is journaled on a pair of ball bearing assemblies 22 that are suitably mounted on the outer cylinder 18 of the cushioning unit. Disposed on diametrically opposite sides of the flywheel 13 are two sets of suitably insulated contact assemblies 24 and 25, shown in Fig. 2, each of which comprises a casing structure secured to the flywheel by means of bolts 26 and containing spring pressed contact elements 27 for controlling the usual control circuits associated with a brake and sanding control equipment of the type hereinbefore mentioned.

The outer end of the cylinder 18 is suitably threaded for receiving a flange member 30, to which is bolted or otherwise secured the commutator block 12. The commutator block 12 is preferably made of a suitable insulating material. As shown in Fig. 2, the commutator block 12 is recessed at opposite sides thereof to clear the two contact assemblies 24 and 25 carried by the flywheel 13. An enlarged shoulder 32 is formed on the commutator block 12 for supporting oppositely disposed sets of contact elements 34, which are normally spaced from and operatively aligned with the respective contact elements 27 of the assemblies 24 and 25. It will be noted that the associated groups of contact elements 27 and 34 may be arranged for sequential engagement in accordance with the relative displacement of the commutator block with respect to the flywheel 13, as will hereinafter be explained.

The commutator block 12 has formed therein a bore 36 in which are mounted a number of slip rings 37, each of which is suitably connected to one of the contact elements 27. Such a connection for one of the slip rings 37 is illustrated in Fig. 2, and includes a conductor 38 extending through the commutator block and a wire 39 leading from the conductor to the corresponding contact element 27. It will be observed that the two sets of contact elements 34 are connected together through the medium of a conductor 40 disposed within the commutator block 12, which is connected to an additional slip ring 41 mounted in the bore 36, as is best shown in Fig. 1.

The brush holder member 15 which may be formed of an insulating material, is carried by the casing section 8 in alignment with the rotary commutator block 12, and has an elongated portion 45 which extends into the bore 36 and within the several slip rings 37 and 41. Formed in the portion 45 of the brush holder member are a plurality of bores in which are mounted spring pressed brushes 47 of suitable design, each of which is adapted to be maintained in sliding contact with one of the slip rings 37 and 41. The brushes 47 are each connected to one of a plurality of conductors 48, which are disposed in the brush holder member 15 and terminate in connector elements 49 at the outer face thereof. It will be understood that the different brake and sanding control circuits, which do not form a part of the present invention and are not shown, may be completed through the medium of conductors 50 attached to the respective connector elements 49, the connector element for the slip ring 41 constituting the battery or power supply conductor.

According to my invention, the independently mounted flywheel 13 is adapted to be rotated with the commutator block 12 and to be maintained normally in a definite position with respect thereto, under a yieldable driving force exerted by magnetically opposed permanent magnets carried by the separate elements. Referring to Fig. 2, it will be observed that the flange member 30, to which the commutator block 12 is secured, is provided with a pair of radially disposed bracket portions 55, which are spaced apart and are adapted to have secured thereto a pair of permanent magnets 56. The permanent magnets 56 may be fastened to the respective bracket portions 55 by means of bolts 57. Mounted on the flywheel 13 is a third permanent magnet 60, which may be secured in place by suitable bolts 61 and is disposed between and in magnetic opposition to the magnets 56.

It will be understood that with the permanent magnets 56 thus arranged in magnetic opposition to the magnet 60, with the respective north and south poles of the former in alignment with the north and south poles of the latter, the repelling forces thereby exerted by the axle mounted magnets 56 against the magnet 60 carried by the flywheel will tend to maintain the latter magnet in the centered position as shown, and thus to cause rotation of the flywheel at the speed at which the commutator block 12 and other elements mounted on the axle are turned. The opposed permanent magnets 56 and 60 thus take the place of springs in maintaining a yieldable driving connection between the driving and driven elements, with the result that the inertia operated device 6 constructed in accordance with my invention is adapted for practically frictionless operation.

In operation, normal rotation of the axle 5 of the vehicle and of the attached elements including the commutator member 12 causes the freely mounted flywheel 13 to follow at the same speed, due to the mutually repellent forces of the permanent magnets 56 and 60, so that the several elements of the rotary inertia control device tend to assume and maintain the normal position as shown in Fig. 2, the respective sets of contact elements 27 and 34 being thereby held apart. If an application of the brake is effected in the usual manner, so that the axle 5 is subjected to a retarding force, the inertia responsive flywheel 13 will tend to overrun the commutator member 12, but as long as the axle 5 is retarded at a normal rate which cannot result in sliding of the associated wheels of the vehicle, this tendency of the flywheel 13 to overrun the other rotary elements will be resisted, by reason of the biasing force resulting from cooperation of the permanent magnets 56 and 60 as just explained. It will thus be seen that under normal operating conditions, the inertia operated control device embodying the invention will remain ineffective to interfere with the operation of the vehicle brakes.

If the rate of retardation of the axle 5 exceeds a predetermined safe rate, however, thus indicating a wheel slipping condition, the inertia torque of the revolving flywheel 13 then becomes effective to overcome the resistance to displacement offered by the magnets 56 and 60, whereupon the flywheel begins to overrun the commutator member 12 carried by the axle, the direction of such relative movement of course depending upon the direction of rotation of the axle. One set of contact elements 27 is thus carried by the flywheel 13 into engagement with the corresponding contact elements 34 mounted on the commutator member 12, with the result that the associated brake controlling equipment, not shown, is operated in the usual manner to effect quick release of the brakes associated with the axle 5, which is then again free to resume a speed corresponding to that of vehicle in time to avoid further development of the undesired wheel slipping condition. As the rate of deceleration of the axle 5 is thus restored to the desired rate ensuring against slipping of the vehicle wheel, the repelling force exerted by the magnets 53 and 60 again becomes effective to cause the flywheel 13 to resume its normal angular position with respect to the commutator block 12, as shown in Fig. 2, thereby separating the contact elements 27 and 34 for breaking the circuit or circuits through which the operation to correct the wheel slipping condition has been effected.

From the foregoing description it will be seen that I have provided an improved electro-inertia control device of the type employed for maintaining the rate of deceleration of an axle or other rotary member of a vehicle within safe limits, and that this device embodies a novel construction and arrangement of parts including a freely rotatable inertia element, contact means controlled thereby, and an assembly of permanent magnets adapted to exert the required biasing force normally resisting displacement of the inertia element.

Having now described my invention, what I claim as new and desire to secure by Letters Patent is:

1. An inertia responsive control device comprising a rotary driving element, a rotary inertia element journaled coaxially of said driving element, magnet means mounted on said driving element, magnet means mounted on said inertia element and disposed in magnetic opposition to said magnet means on the driving element, whereby said two magnet means coact to maintain a yieldable driving force through which the driving element normally effects rotation of the inertia element, and switch means operable upon relative rotary movement between said elements in response to a sudden change in the speed of said driving element.

2. An inertia responsive control device comprising a rotary driving element, a rotary inertia element journaled coaxially of said driving element, a permanent magnet mounted on said driving element, a permanent magnet mounted on said inertia element and disposed in magnetic interlocking relation with said first named magnet, whereby said magnets are adapted to coact to exert a driving torque on said inertia element during rotation of said driving element, and electrical contact means operable upon relative rotary movement of said inertia element with respect to said driving element in response to deceleration of said driving element at an excessive rate.

3. An inertia responsive control device comprising a rotary driving element having a pair of spaced radial arms, permanent magnets mounted on said arms, respectively, a rotary inertia member journaled coaxially of said driving element, a permanent magnet mounted on said inertia member and disposed in magnetic repelling relation with respect to said magnets on the driving element, whereby said driving element is normally effective to exert constant torque on said inertia member during operation of the device, and circuit control means constructed and arranged for operation upon displacement of said inertia member relative to said driving element in response to a sudden change in speed.

4. In a rotary inertia responsive electric control device for detecting and controlling the rate of deceleration or acceleration of a vehicle axle or the like, in combination, a cushioning hub assembly secured to the axle and including a rubber vibration absorbing element, a flywheel member journaled on said hub assembly and independently rotatable thereon, a commutator member secured to said hub assembly for rotation thereby, cooperative contact elements carried by said flywheel member and by said commutator member for selecting associated control circuits upon relative rotary movement of one of said members with respect to the other, and yieldable driving means for said flywheel member comprising permanent magnet means carried thereby, and permanent magnet means carried by said hub assembly, said two magnet means being adapted to cooperate for yieldingly maintaining said flywheel member in a normal angular position relative to said commutator member.

5. In a rotary inertia responsive electric control device for detecting and controlling the rate of deceleration or acceleration of a vehicle axle or the like, in combination, a cushioning hub assembly secured to the axle and including a rubber vibration absorbing element, a flywheel member journaled on said hub assembly and independently rotatable thereon, a commutator member secured to said hub assembly for rotation thereby, cooperative contact elements carried by said flywheel member and by said commutator member for selecting associated control circuits upon relative rotary movement of one of said members with respect to the other, and yieldable driving means for said flywheel member comprising a central permanent magnet carried by said flywheel, a permanent magnet carried by said hub assembly and disposed at one side of said central magnet in mutual repelling relation thereto, and another permanent magnet also carried by said hub assembly and disposed at the opposite side of said central magnet in mutual repelling relation, said magnets being cooperative to resist relative rotation of said flywheel and commutator members.

GEORGE K. NEWELL.